United States Patent

[11] 3,596,865

| [72] | Inventor | Carlo Camossi<br>c/o Avv. Ravagli Via Corridoni, 6, Milan, Italy |
|---|---|---|
| [21] | Appl. No. | 731,513 |
| [22] | Filed | May 23, 1968 |
| [45] | Patented | Aug. 3, 1971 |
| [32] | Priority | May 26, 1967 |
| [33] | | Italy |
| [31] | | 807666 |

[54] METAL CABLE ABSORBER MOUNTING SYSTEM
10 Claims, 7 Drawing Figs.

[52] U.S. Cl. .................................................. 248/358, 267/148, 267/160
[51] Int. Cl. ..................................................... F16l 15/04
[50] Field of Search ........................................... 248/358 A, 22, 21; 267/148, 149, 160

[56] References Cited
UNITED STATES PATENTS

| 3,023,993 | 3/1962 | Kerley | 248/358 |
| 3,031,163 | 4/1962 | Kerley | 248/358 |
| 3,204,912 | 9/1965 | Lawrence | 248/358 |
| 3,239,207 | 3/1966 | Camossi | 248/358 X |

*Primary Examiner*—Chancellor E. Harris
*Attorney*—Jennings Bailey, Jr.

ABSTRACT: A metal cable shock absorber mounting system between a vibrating member and a member to be damped, wherein at least one of the shock absorbing supports comprising a plurality of metal cables is free move independently of the member or element to be damped.

Patented Aug. 3, 1971 3,596,865
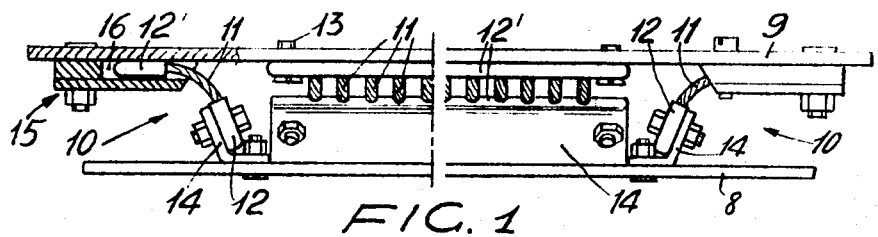
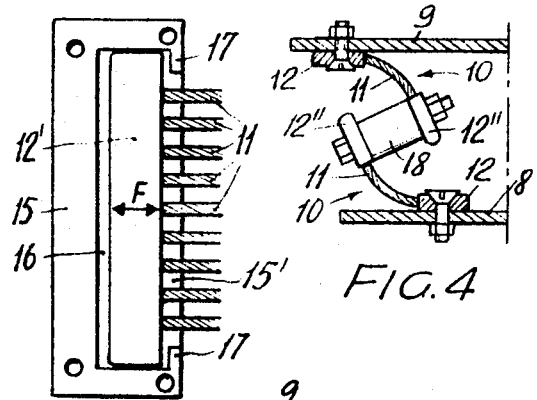
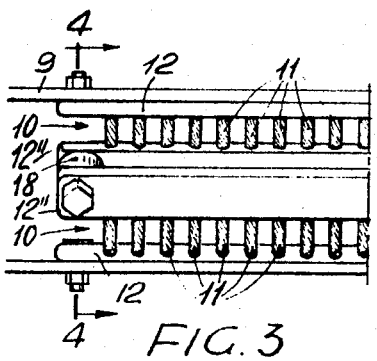
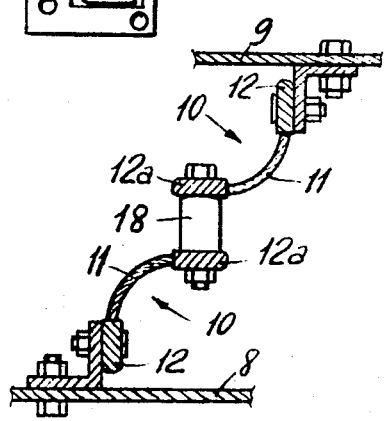
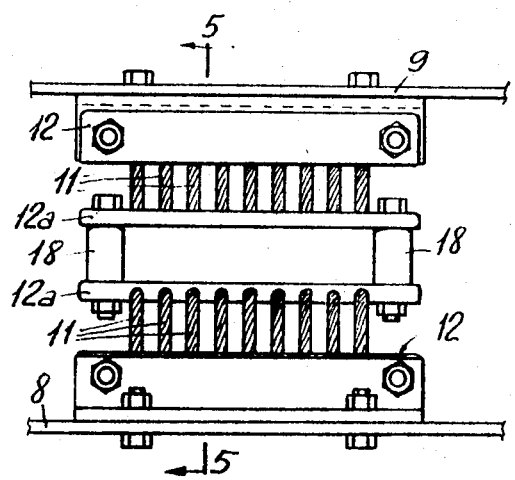
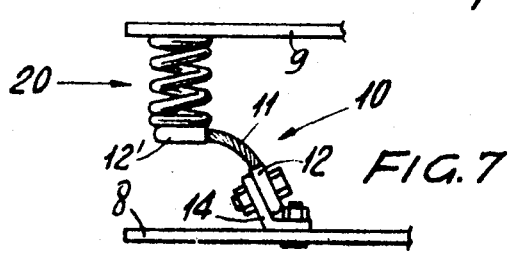
INVENTOR
CARLO CAMOSSI
BY *Jennings Bailey*
ATTORNEY 3,596,865

METAL CABLE ABSORBER MOUNTING SYSTEM

BACKGROUND OF THE INVENTION

1. Field of the Invention

The invention relates to shock absorbers formed of metal cable segments or lengths.

2. The Prior Art

Some types are known of vibration and shock dampening metal cable shock absorber comprising a plurality of metal cable segments or lengths strung between supports parallel to one another and made of metal or synthetic materials. Both the number and the length of such segments are variable in connection with the weights to be carried and frequencies to be "cut off".

As known, by interposing these elements, either individually or in a combination of fixed connecting plates joining the elements two by two, between two members, one of which is movable or vibrating, in the second member such a damping for the frequency amplitudes is obtained as to provide a nearly complete stability.

In all of the applications carried out up to this time, and being the subject of previous patents or patent applications also in the name of the present applicant, the apparatus to be damped was connected to the vibrating member by these metal cable elements rigidly joined to one another by means of metal connecting plates, so as to form actual supporting quadrangles, thus achieving satisfactory results from a technical efficiency standpoint.

New use requirements for such metal cable shock absorbers, and particularly the small availability of space for the connections, as well as the problem of damped suspension of wall panels, have led to the design of new mounting systems which would allow a greater variety of applications by the same elements.

SUMMARY OF THE INVENTION

It is the object of the present invention to provide a novel system which can be accomplished according to different embodiments, some of which have been shown and described, particularly adapted to join two substantially parallel plates to each other, one of which plates forms part of a moving member subjected to irregular or uncontrolled movements, as well as vibrations and/or shocks, and second plate of which forms an integrating part of devices; apparatus or mechanism which are to be "insulated" from such vibrations and/or shocks.

The basic feature of the present mounting system is that at least one of the supports of the metal cable shock absorbing element is free move independently of the member to be damped, that is, it is not rigidly connected to the latter.

Thus, there is provided a release for the metal cable shock absorbing element which, in the case of a rigid connection on both sides, would be "forced" (hyperstatic) and thus would readily cause damage to the cable, particularly during high amplitude oscillations due to resonance frequency.

BRIEF DESCRIPTION OF THE DRAWINGS

The accompanying drawing schematically shows by way of example some preferred embodiments of the present system, and particularly:

FIG. 1 is a side, partly sectional view showing a first embodiment with a sliding slide connection;

FIG. 2 is a plan view of the sliding end support of the shock absorber in a guide fast with the member to be damped;

FIG. 3 is a side view showing a second embodiment with two interconnected shock absorbers;

FIG. 4 is a vertical section taken on line 4-4 of FIG. 3;

FIG. 5 is a sectional view taken on line 5-5 of FIG. 6, showing another connection for two shock absorbers;

FIG. 6 is a side view of FIG. 5; and

FIG. 7 is a side view of a further embodiment for a connection

DESCRIPTION OF THE PREFERRED EMBODIMENTS

According to the first embodiment (FIGS. 1 and 2), the shock absorbing device is to damp the vibrations between the lower plate 8 and the upper plate 9 substantially parallel to each other and connected by interposition of shock absorbing elements 10. In this embodiment such elements comprise a plurality of metal cable segments 11 fixed at the two ends thereof between two parallel supporting bars 12-12' of metal or plastic material, in which the ends of cables 11 are secured.

The connection for shock absorbers 10 to plates 8 and 9 is accomplished at the bottom (FIG. 1) by two angle irons 14, whereas the upper bars 12' are contact guided by sliding within a box 15 surrounding it and fast with plate 9, leaving a slight clearance between the parallel surfaces, while the length of seat 16 allows a limited sliding for bar 12' in the direction of arrows F (FIG. 2). Seat 16 is provided with an open side 15' and two side end shoulders 17, limiting the movements and preventing the bar from emerging. In order to assist in connection, said cable segments are bent.

In the second embodiment shown in FIG. 3, the shock absorbing unit 3 comprises two elements 10 arranged on two parallel and separated planes. Each element 10 is secured by an end bar 12 respectively to one of the parallel planes 8 and 9; said elements 10 are interconnected by the other end bars through at least two spacers 18. The connection lines for bars 12 to plates 8 and 9 are displaced with respect to the vertical, so that the cable segments 11 take a curved position relative to spaces 18. Cables 11, which are bent, can be arranged relative to spacers 18 at two different positions, as shown in FIGS. 3 and 4, but the concept is still the same and the selection of either arrangement is dependent only on the character and intensity of vibrations to be damped and/or the spacing between said plates 8 and 9.

The advantages are clear from the disclosure of the two embodiments for this novel mounting system.

Particularly, the first embodiment (FIGS. 1 and 2) will assure an increase in elasticity together with a more effective damping action because of sliding of support 12 within the box guide 15, wherein an amount of grease or other viscous material can be introduced.

It is evident that with such a solution of vibration absorbing element 10 can work better, particularly at the resonance frequency of the system, that is when the rate of amplitude being transmitted as maximum and the cables are more stressed, as the partially free portion allows a greater freedom of movement preventing wear thereof, as a result.

In the other embodiments of the mounting system (FIGS. 3, 4, 5 and 6), one of the supports for the metal cable shock absorbing element 10 is connected with an intermediate substantially movable member 18 of variable length, in turn connected with the member to be damped through resilient elements. Practically, the connection between the movable intermediate member 18 and the member to be damped is accomplished by means of a second metal cable shock absorber 10 symmetrically connected with respect to the former, although in some circumstances the bendings can have the concavity thereof in the same direction.

In other words, the two parallel portions of the carrier member 8 and member 9 to be damped, rather than being joined by means of two shock absorbing elements, wherein both of the outer supports are rigidly connected to said parallel portions 8 and 9 and the inner supports are rigidly connected by a metal connecting plate so as to form a right angled unit, are connected instead, according to the invention, by two metal cable elements 10, the outer supports 12 of which are connected with said parallel members 8 and 9, while the two inner supports 12a are joined to each other by a movable intermediate member 18, referred to as a spacer, so as a provide an adjustable type of hinge, making it possible to increase or to decrease at will the inclination and hence the elasticity of the system, also in these circumstances (FIGS. 2,4, 5 and 6) confirming the concept of a support end for the partially free cable shock absorbing element.

The concept of the solutions hitherto shown being unaltered, it is possible at the limit to use also only one metal cable vibration absorbing element, the supports of which are so connected: the first, directly to plate 8 of the vibration absorbing member, the second, through some type of resilient junction means, directly to plate 9 of the member to be damped, so as to provide some type of hinge. This approach is shown in FIG. 7, wherein a single shock absorbing element 10, directly connected to plate 8 by connecting plate 14 with its bar 12, is connected to plate 9 through the interposition between the latter and bar 12' of a member 20—which in the figure is a helical spring —which can be a preferably resilient metal spacer, or other material of the desired elasticity.

It should be noted that by known connecting plate mounting systems a single anchoring position can be achieved for the two parallel portions of the members to be joined and, accordingly, an efficient system for a given input frequency, while to vary the amplitude of output frequency it is necessary to vary accordingly the length of the cable segments by replacing the shock absorbing element. By the system according to the invention, the replacement of the connecting plates with the spacer device makes it possible to increase and to decrease the elasticity for the entire shock absorbing system in accordance with the greater or less length of said spacers varying, as a result, the connection positions for the other ends of the elements of the two members to be connected, determining and providing, for such given member to be damped, the most suitable solution by the same types of shock absorbing elements. In other words, the weight of the member to be damped being unaltered, it is possible by the present novel system to vary the frequencies to be "cut off" by varying the length of the spacers and the fastening distances of members to be connected varying, as a result, the elasticity of the system, or vice versa, and this without having to replace any shock absorbing element by one of a different size.

Undoubtedly, this novelty is very significant, considering that a system so mounted can operate perfectly in all of the three orthogonal directions, can be adopted in all the suspension positions avoiding the use of connecting plates, brackets and so on, and allows elasticity to be adjusted as desired, of course within the tolerance limits of cables 10. By way of example, an apparatus weighting 10 Kg., mounted on a vibrating support and wherein a system is interposed of metal cable elements joined by adjustable spacers, has a variation in resonance frequency from 10 to 4 Hz. when the length for the spacers goes from 10 to 20 mm., the input frequency amplitude being constant and equal to $\pm 1$ mm., which is not absolutely the case with fixed connecting plate mounting and the same shock absorbing elements. Once the desired solution is found, by means of the adjustable spacers, there can be of course adopted metal cable elements connected by means of a fixed spacer with a further economical advantage.

A further advantage of the present system is that of reducing the space as required for the connection between the two members to be dampened.

What is claimed is:

1. A metal cable shock absorber system between upper and lower members comprising two shock absorbing elements between said upper and lower members, each shock absorbing element comprising a plurality of metal cables, a bar connected to each of the members, each of the cables having an outer end rigidly held in one of said bars, an intermediate member, each of the cables having an inner end rigidly held in the intermediate member, the longitudinal axes of the cables lying in substantially vertical planes, at least the cable ends of one of the pair of outer ends and the pair of inner ends lying substantially parallel to each other.

2. A device as claimed in claim 1, in which the cables are bent into curved form and the concave sides of the curved cable elements face in opposite directions.

3. A device as claimed in claim 3, in which the longitudinally axes of the cable ends held in the intermediate member lie at substantial angles to the longitudinal axes of the cable ends held in said bars.

4. A device as claimed in claim 1, in which the longitudinal axes of the cable ends held in the intermediate member lie at substantial angles to the longitudinal axes of the cable ends held in said bars.

5. A device as claimed in claim 4, in which the ends of the cables held in said bars are substantially parallel to each other.

6. A device as claimed in claim 5 in which the ends of the cables held in said intermediate member are substantially parallel to each other.

7. A device as claimed in claim 4 in which the ends of the cables held in said intermediate member are substantially parallel to each other.

8. A device as claimed in claim 1 in which the ends of the cables held in said bars are substantially parallel to each other.

9. A device as claimed in claim 8 in which the ends of the cables held in said intermediate member are substantially parallel to each other.

10. A device as claimed in claim 1 in which the cables are bent into curved form and the concave sides of the curved cable elements face towards the intermediate element.